Nov. 14, 1939.  L. R. FRANK ET AL  2,180,044
SEED AND MATERIAL DISTRIBUTOR ATTACHMENT TO TRUCKS
Filed May 4, 1938   2 Sheets-Sheet 1
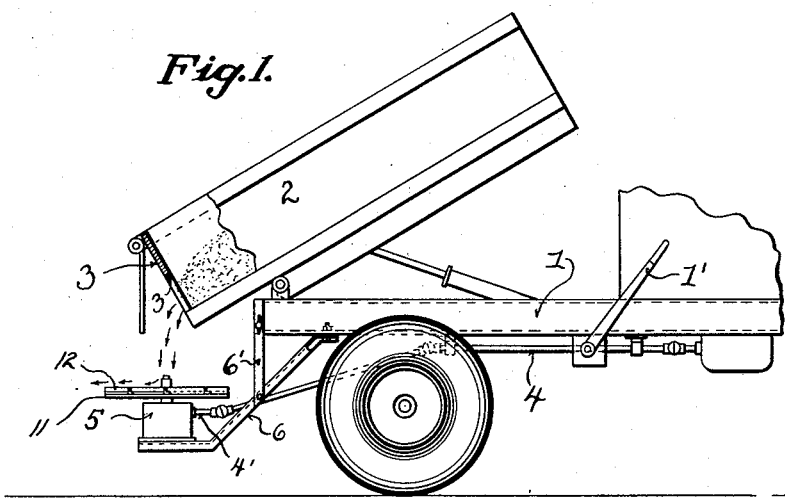
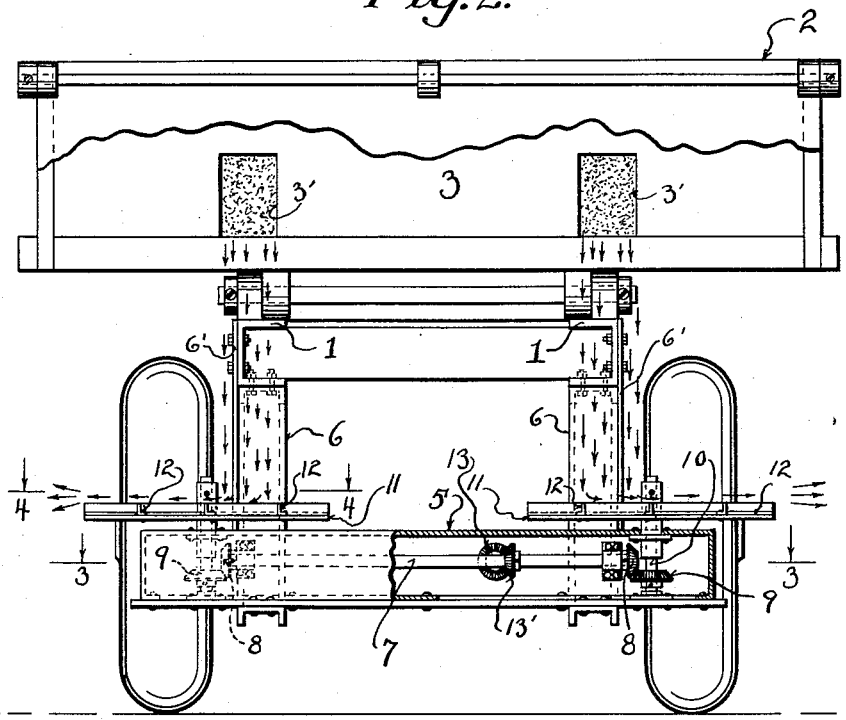
Inventors.
Leo R. Frank
and Rodell A. Dregney
By
Attorneys.

Nov. 14, 1939.   L. R. FRANK ET AL   2,180,044
SEED AND MATERIAL DISTRIBUTOR ATTACHMENT TO TRUCKS
Filed May 4, 1938   2 Sheets-Sheet 2
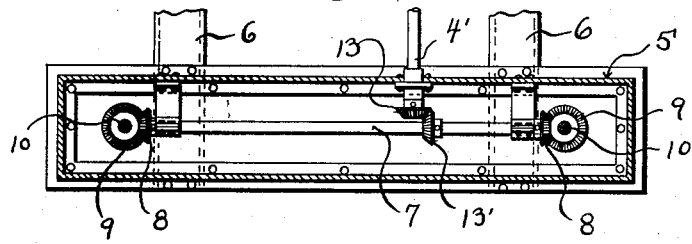
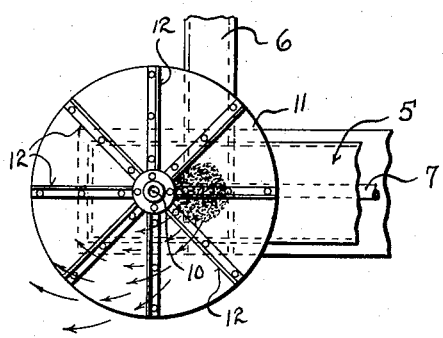
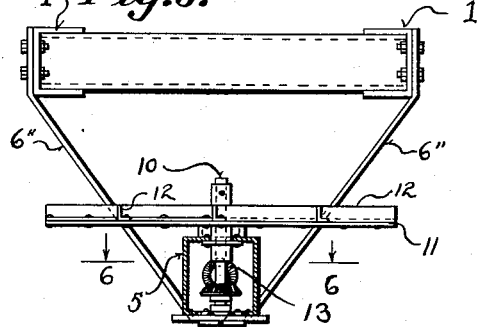
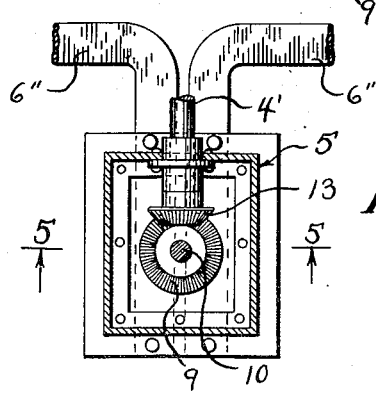
Inventors.
Leo R Frank
and Rodell A. Dregney
By
Attorneys.

Patented Nov. 14, 1939

2,180,044

UNITED STATES PATENT OFFICE 2,180,044

SEED AND MATERIAL DISTRIBUTOR ATTACHMENT TO TRUCKS

Leo R. Frank, Milton Junction, and Rodell A. Dregney, Janesville, Wis.

Application May 4, 1938, Serial No. 205,996

2 Claims. (Cl. 275—8)

Our invention refers to distributor attachments to trucks for spreading lime, seed, fertilizer, or any material which must be finely and uniformly distributed.

A specific object of our invention is to provide a power-driven distributor at the rear end of the truck, adapted to receive spouted material from an inclined truck body, the said material being thrown off centrifugally from discs mounted upon an oil-tight casing carrying suitable gearing for imparting the desired power drive to the discs.

With the above and other objects in view, the invention consists in certain peculiarities of construction and combination of parts, as will be more fully set forth in connection with the accompanying dawings and subsequently claimed.

In the drawings:

Figure 1 represents a fragmentary elevation of the rear portion of a motor-driven truck, having the usual tiltable body, the said truck being provided with a distributor mechanism embodying the features of our invention.

Figure 2 is a rear view of the same, with parts broken away and in section to more clearly illustrate structural features.

Figure 3 is a sectional plan view of an oil-proof gear box embodying the features of our invention.

Figure 4 is a plan view of one end of the gear box carrying distributor discs, and particularly illustrating the points of discharge upon the discs.

Figure 5 is a rear sectional elevation of a modified form of our invention wherein a single distributing disc is utilized, the section being indicated by line 5—5 of Figure 6; and Figure 6 is a sectional plan view of the gear box carying a single unit, the section being indicated by line 6—6 of Figure 5.

Referring more particularly to the drawings, the numeral 1 indicates the back of a truck frame beam, and the numeral 2 the body thereof pivoted to the rear end of said truck. The body in this instance is provided at the tail-end with a plate 3 just forward of the tail-gate, which plate has discharge openings 3' therein. The vehicle motor is provided with a power take-off shaft 4, which shaft is connected by universal joints to a shaft section 4', which enters a closed gear box 5. The power take-off 4 is also provided with a clutch lever 1', which is adapted to connect or disconnect the power take-off shaft from the engine.

The gear box 5 is of metal sheeting in rectangular form, and is so constructed as to be practically oil-tight, whereby said box is filled with grease, or suitable oil, for lubricating a plurality of gears therein, which will be hereinafter specifically described. The vehicle gear box is positioned downwardly of and slightly beyond the end of the vehicle frame beam, and is supported by brackets 6, which are secured to the vehicle beams 1, The brackets are also supported by brace arms 6', which, as shown in Figure 1, may be attached to the beams through a bolt and slot connection. By this arrangement the gear box can be vertically adjusted in either direction to the desired elevation from the ground. The vertical adjustment of the gear box is effected by raising or lowering the brace 6' by tightening and loosening the bolt and slot connection of said brace with reference to the beam 1, it being understood that the bracket 6, which is also anchored to the beam, may be rocked upon its anchor connection, incidental to depressing or raising the brace arm 6'.

Mounted within the gear box in suitable bearings is a longituidnally disposed driven shaft 7, which shaft terminates with beveled gears 8—8. These gears are meshed with similar beveled gears 9—9, which are carried by vertically disposed stud shafts 10. Each stud shaft is suitably journaled within the box and extends outwardly thereof upon the top side of the gear box for the reception of rotary distributing discs 11. The discs 11 carry radial fins 12 for the purpose of more effectually throwing off the material to be distributed.

The short section 4' of the power take-off shaft is journaled in the side of said gear box and extends through one wall thereof terminating with a beveled gear 13, which beveled gear meshes with a corresponding beveled gear 13' mounted on the longitudinally disposed drive shaft 7.

As best shown in Figures 2 and 4 of the drawings, the discharge openings or mouths of the tail-gate plate 3 are approximately alined slightly between the axis of the distributor discs, or to one side of the same. By this arrangement the material to be distributed is discharged at a point inside of the axis of said disc, wherein in the rotation of the discs it is picked up, and by centrifugal force uniformly distributed, due to the fact that most of the centrifugal force, by this arrangement, has a tendency to throw the material to both sides of he vehicle uniformly, and also to throw a slight amount between the discs, which is sufficient to uniformly distribute the material from the nearest to the farthest point of delivery.

Attention is also directed to the fact that the gear box, being oil-tight, will prevent wear of the gears through dust or the like, which under ordinary conditions would quickly create a cloud at the back of the vehicle, and thereby seriously effect substantial wear of the gears, and so forth.

Referring now particularly to Figures 5 and 6 of the drawings, we have illustrated a modified form of the invention, wherein a single disc is utilized. In this instance, the gear box is substantially a cubical unit, which is positioned centrally of the vehicle having brace arms 6".

It will be noted that in this modified form of our invention, a longitudinal driven shaft is dispensed with, and the power take-off shaft, with its gear 13, is directly meshed with the gear 9 of the vertical disc shaft 10. Hence, in this arrangement, the device is quite simplified, and the single distributor disc, being positioned in the center of the rear end of said vehicle, the point of mouth discharge is directly upon the center disc, which disc performs the entire function of distributing in place of the double disc type.

We claim:

1. In a vehicle having a power take-off drive shaft, a frame and a dump body pivoted to the rear end thereof, the dump body being provided with a pair of tail discharge openings; the combination of a spreader comprising a rectangular hermetically sealed gear box disposed transversely at the rear of the vehicle, a transversely disposed drive shaft journaled therein, a pair of vertically disposed stud shafts journaled in the gear box and extending upwardly through the top wall thereof, a flat disc mounted on the outer end of each stud shaft having radial fins upon its upper face, the axes of said discs being off-set with relation to the discharge openings, driving gears for the discs carried by the drive shaft and stud shafts, a power take-off shaft extending into the gear box, driving gears carried by the power take-off shaft and drive shaft, and brackets extending from the rear end of the vehicle frame for supporting the aforesaid gear box.

2. In a vehicle having a power take-off drive shaft, a frame and a dump body pivoted to the rear end thereof, the dump body being provided with a pair of tail discharge openings; the combinaiton of a spreader comprising a rectangular hermetically sealed gear box disposed transversely at the rear of the vehicle, a transversely disposed drive shaft journaled therein, a pair of vertically disposed stud shafts journaled in the gear box and extending upwardly through the top wall thereof, a flat disc mounted on the outer end of each stud shaft having radial fins upon its upper face, the axes of said discs being off-set with relation to the discharge openings, driving gears for the discs carried by the drive shaft and stud shafts, a power take-off drive shaft extending into the gear box, driving gears carried by the power take-off shaft and drive shaft, and adjustable brackets extending from the rear end of the vehicle frame for supporting the aforesaid gear box.

LEO R. FRANK.
RODELL A. DREGNEY.